(12) United States Patent
Urmanov et al.

(10) Patent No.: US 7,171,589 B1
(45) Date of Patent: Jan. 30, 2007

(54) METHOD AND APPARATUS FOR DETERMINING THE EFFECTS OF TEMPERATURE VARIATIONS WITHIN A COMPUTER SYSTEM

(75) Inventors: Aleksey M. Urmanov, San Diego, CA (US); Lawrence G. Votta, Sammamish, WA (US); Kenneth C. Gross, San Diego, CA (US); Su-Jaen Huang, Saratoga, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 551 days.

(21) Appl. No.: 10/739,474

(22) Filed: Dec. 17, 2003

(51) Int. Cl.
*G06F 11/00* (2006.01)
(52) U.S. Cl. .................... 714/47; 324/760; 702/132
(58) Field of Classification Search ................ 714/47, 714/25, 41; 324/760; 702/132, 99; 374/21
See application file for complete search history.

(56) References Cited

U.S. PATENT DOCUMENTS

| | | | |
|---|---|---|---|
| 4,937,763 A | 6/1990 | Mott ..................... 364/550 |
| 5,543,727 A * | 8/1996 | Bushard et al. ............. 324/760 |
| 5,586,061 A * | 12/1996 | Williams et al. ............ 702/130 |
| 5,744,975 A * | 4/1998 | Notohardjono et al. ..... 324/760 |
| 6,148,418 A * | 11/2000 | Wang et al. .................. 714/25 |
| 6,863,123 B2 * | 3/2005 | Wang et al. ................. 165/263 |
| 6,882,950 B1 * | 4/2005 | Jennion et al. ............. 702/118 |
| 6,901,303 B2 * | 5/2005 | Larson et al. ............... 700/108 |
| 6,985,317 B2 * | 1/2006 | McConnell et al. .......... 360/31 |
| 2002/0109518 A1 * | 8/2002 | Saito et al. .................. 324/760 |
| 2005/0083656 A1 * | 4/2005 | Hamman ..................... 361/699 |
| 2005/0137824 A1 * | 6/2005 | Augustin et al. ........... 702/132 |

* cited by examiner

*Primary Examiner*—Robert Beausoliel
*Assistant Examiner*—Marc Duncan
(74) *Attorney, Agent, or Firm*—Park, Vaughan & Fleming, LLP

(57) ABSTRACT

One embodiment of the present invention provides a system that facilitates determining the effects of a temperature variation in a computer system. The system operates by systematically varying the flow of a coolant through the computer system to produce a temperature variation in the computer system while the computer system is operating. While this temperature variation is taking place, the system monitors the computer system to determine effects of the temperature variation on the computer system.

32 Claims, 2 Drawing Sheets

METHOD AND APPARATUS FOR DETERMINING THE EFFECTS OF TEMPERATURE VARIATIONS WITHIN A COMPUTER SYSTEM

BACKGROUND

1. Field of the Invention

The present invention relates to techniques for diagnosing causes of problems within computer systems. More specifically, the present invention relates to a method and an apparatus that facilitates determining the effects of temperature variations within a computer system while the computer system is operating.

2. Related Art

As electronic commerce grows increasingly more prevalent, businesses are increasingly relying on enterprise computing systems to process ever-larger volumes of electronic transactions. A failure in one of these enterprise computing systems can be disastrous, potentially resulting in millions of dollars of lost business. More importantly, a failure can seriously undermine consumer confidence in a business, making customers less likely to purchase goods and services from the business.

When enterprise computing systems fail, it is often due to a system hardware failure. During such failures, it is common for components, subsystems, or entire servers to indicate they have failed by either "crashing" or otherwise halting processing, with or without writing failure messages to a system log file. "No-Trouble-Found" (NTF) events arise when a service engineer is dispatched to repair a failed server (or the failed server is returned to the manufacturer) and the server runs normally with no indication of a problem. NTF events constitute a huge cost because system boards (possibly costing hundreds of thousands of dollars) may need to be replaced. Furthermore, it is embarrassing not to be able to determine the root cause of a problem, and customers are generally happier when a root cause can be determined.

In many cases, NTF events arise through intermittent failure mechanisms in hardware components. Some of these intermittent hardware faults coincide with small variations in the internal temperature of the servers. There are several theoretical explanations for such behavior, including changes in mechanical stresses, delamination of bonded components, thermal expansion effects on interconnects and soldered joints, exacerbation of microscopic electrostatic discharge effects, and other component reliability phenomena that are affected by temperatures, temperature gradients, and temperature cycling.

Hence, what is needed is a method and an apparatus that facilitates determining the causes of problems that arises from or are accelerated by temperature variations in a computer system.

SUMMARY

One embodiment of the present invention provides a system that facilitates determining the effects of a temperature variation in a computer system. The system operates by systematically varying the flow of a coolant through the computer system to produce a temperature variation in the computer system while the computer system is operating. While this temperature variation is taking place, the system monitors the computer system to determine effects of the temperature variation on the computer system.

In a variation on this embodiment, monitoring the computer system involves monitoring for system errors that arise during operation of the computer system.

In a further variation, the system additionally attempts to determine a root cause of an error that arises during operation of the computer system.

In a variation on this embodiment, monitoring the computer system involves monitoring physical performance parameters, such as temperature, voltage and current, within the computer system.

In a further variation, monitoring physical performance parameters involves attempting to detect a failing sensor within the computer system.

In a variation on this embodiment, monitoring the computer system involves monitoring internal performance parameters maintained by software within the computer system.

In a variation on this embodiment, prior to commencing operation of the computer system, an operator or an automated installation mechanism installs a telemetry harness within the computer system to gather performance parameters for the computer system.

In a variation on this embodiment, the system varies the flow of coolant in a manner that produces a periodic variation in the temperature of the computer system.

In a variation on this embodiment, the system varies the flow of coolant in a manner that produces a substantially sinusoidal variation in the temperature of the computer system.

In a variation on this embodiment, the coolant is air, and the system varies the flow of the air by varying the speed of a cooling fan that blows the air through the computer system.

In a variation on this embodiment, the coolant is a liquid, and the system varies the flow of the coolant by varying the speed of a coolant pump that pumps the coolant through the computer system.

DETAILED DESCRIPTION

Figure 1:
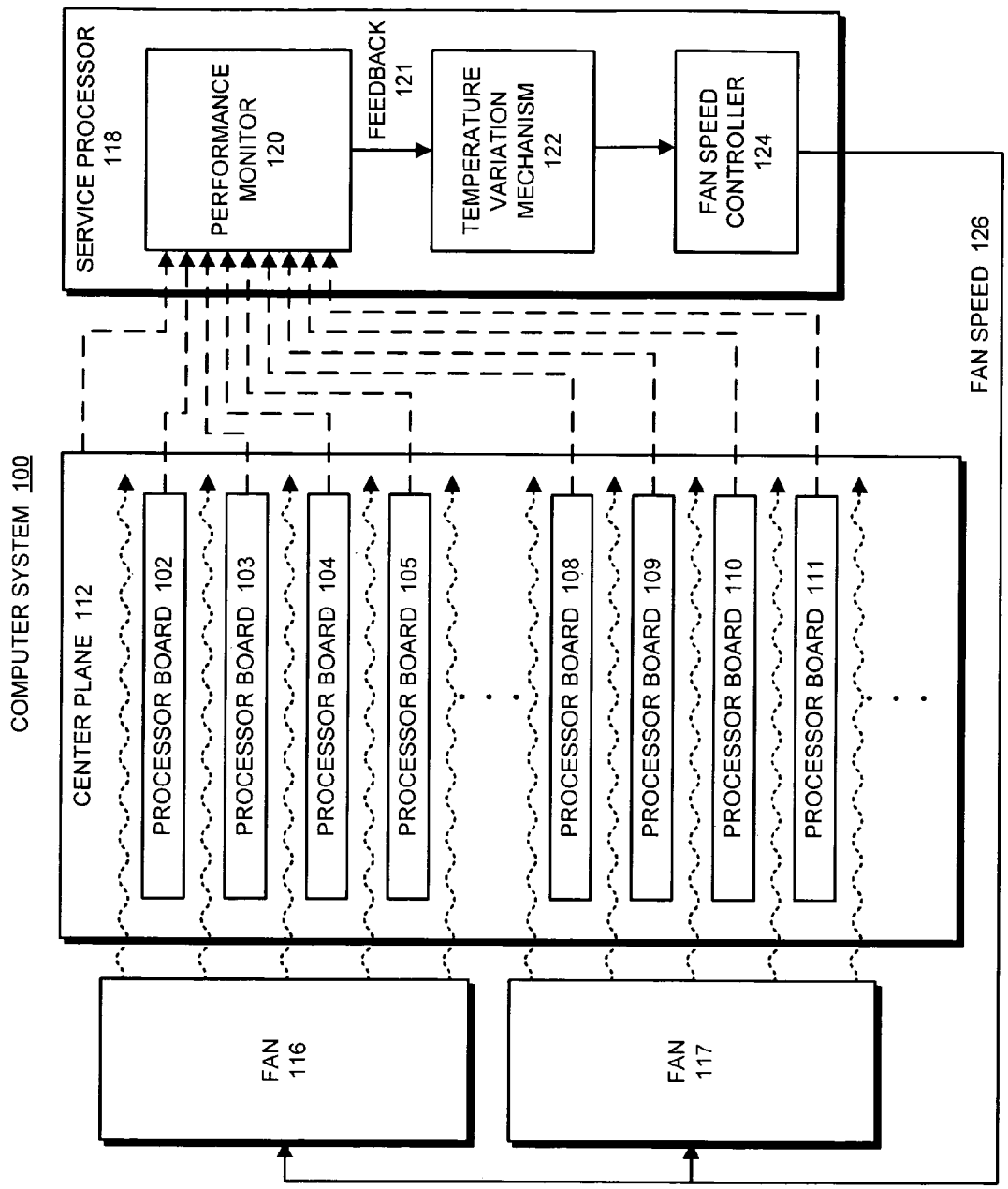
FIG. 1 illustrates a computer system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Thermal Nudge Exerciser

Armed with the knowledge that small temperature fluctuations (sometimes as small as 5 degrees C.) can accelerate a class of NTF initiator mechanisms in high-end servers, a procedure has been devised investigate these initiator mechanisms. This procedure is called the "thermal nudge" exerciser.

High-end computer servers contain a plurality of mechanical fans that are deployed in one or more locations to force high air flows through the server for the purposes of cooling. A typical example is the SUN F15K server, which is distributed by SUN Microsystems, Inc. of Santa Clara, Calif. The SUN F15K server contains 16 mechanical fans that are deployed at two horizontal elevations.

In one embodiment of the present invention, the thermal nudge exerciser is a system control script that generates a sequential perturbation in fan speeds in such a manner as to create small-amplitude standing wave variations in temperature throughout the inside of the server. Moreover, at any given point within the server, the temperature perturbations are approximately sinusoidal in time.

This "thermal nudge" procedure simultaneously achieves two objectives that substantially elevate the probability of identifying spurious or intermittent sources of NTF events. (1) It induces small-amplitude temperature variations that are small enough to not introduce effects deleterious to the long-term reliability of the server, but create larger amplitudes, gradients, and cycle frequencies than would be observed if the server were simply operating in a typical environment of a customer datacenter. (2) Furthermore, the fact that the induced temperature variations are periodic with time enables sophisticated analysis techniques to be used to compute highly accurate quantitative diagnostic metrics that are impossible to obtain from typical ambient-temperature operation of servers. Diagnostic metrics that are enabled by the thermal nudge procedure include: thermal coupling coefficients, transfer functions, and phase (lead/lag) relationships between and among the numerous system board components that are instrumented with temperature sensors throughout high-end servers.

The foregoing two features enabled by the systematic thermal nudge exerciser enhance the likelihood of identifying intermittent sources of NTF events in high-end servers. Moreover, the thermal nudge exerciser can be deployed without any hardware modifications to high-end servers. This means that these tests can be applied directly to existing servers at customers' sites. This mitigates a separate suspected cause of NTF events: mechanisms that occur in a customer's datacenter configuration, but which are not reproducible when field replaceable units (FRUs) are removed from the datacenter and shipped to a repair depot. This significantly enhances the likelihood of reproducing and accurately root-causing the sources of a nontrivial source of NTF events in customer servers, without having the added customer dissatisfaction that results for removing their systems from their datacenter.

Finally, the thermal nudge exerciser test described in this disclosure may also be deployed in factory qualification testing to "tease out" sources of NTF initiator mechanisms before servers are ever shipped to the customers, thereby enhancing quality, mitigating a source of warranty losses, and minimizing a source of customer dissatisfaction for Sun customers.

The thermal nudge exerciser is described in more detail below with reference to FIGS. 1 and 2.

Computer System

FIG. 1 illustrates a computer system 100 in accordance with an embodiment of the present invention. As is illustrated in FIG. 1, computer system 100 includes a number of processor boards 102–105 and a number of memory boards 108–111, which communicate with each other through center plane 1112.

In one embodiment of the present invention, these system components are field replaceable units (FRUs), which are independently monitored as is described below. Note that all major system units, including both hardware and software, can be decomposed into FRUs. Note that a software FRU can include, an operating system, a middleware component, a database, or an application.

Computer system 100 is associated with a service processor 118, which can be located within computer system 100, or alternatively can be located in a standalone unit separate from computer system 100. Service processor 118 performs a number of diagnostic functions for computer system 100. One of these diagnostic functions involves recording performance parameters from the various FRUs within computer system 100. These performance parameters are received by performance monitor 120 within service processor 118. Alternatively, these performance parameters can be sent across a network to a remote monitoring center (not shown).

Service processor 118 also includes a temperature variation mechanism 122, which operates in conjunction with a fan speed controller 124 to control the speed of cooling fans 116 and 117. Note that cooling fans 116 and 117 can be controlled by changing fan speed, or if the fans only have one speed, by cycling the fans on and off.

Cooling fans 116 and 117 regulate airflow through computer system 100 in a manner that produces temperature variations within computer system 100. In one embodiment of the present invention, temperature variation mechanism 122 receives feedback from performance monitor 120, which allows the temperature variation mechanism 122 to more accurately produce desired temperature variations in computer system 100. This temperature variation process is described in more detail below with reference to FIGS. 1 and 2. In another embodiment of the present invention, instead of controlling fan speed, airflow is regulated by controlling adjustable louvers that restrict-airflow through the computer system.

In yet another embodiment of the present invention, a liquid coolant (instead of air) is pumped through the computer system. In this embodiment, the system varies the flow of the coolant by varying the speed of a coolant pump that pumps the coolant through the computer system.

Although the present invention is described in the context of a server computer system 100 with multiple processor boards and an associated service processor 118. The present invention is not meant to be limited to such a server computer system. In general, the present invention can be applied to any type of computer system, with or without a service processor 118. This includes, but is not limited to, a computer system based on a microprocessor, a mainframe computer, a digital signal processor, a portable computing device, a personal organizer, a device controller, and a computational engine within an appliance.

Determining Effects of a Temperature Variation

Figure 2:
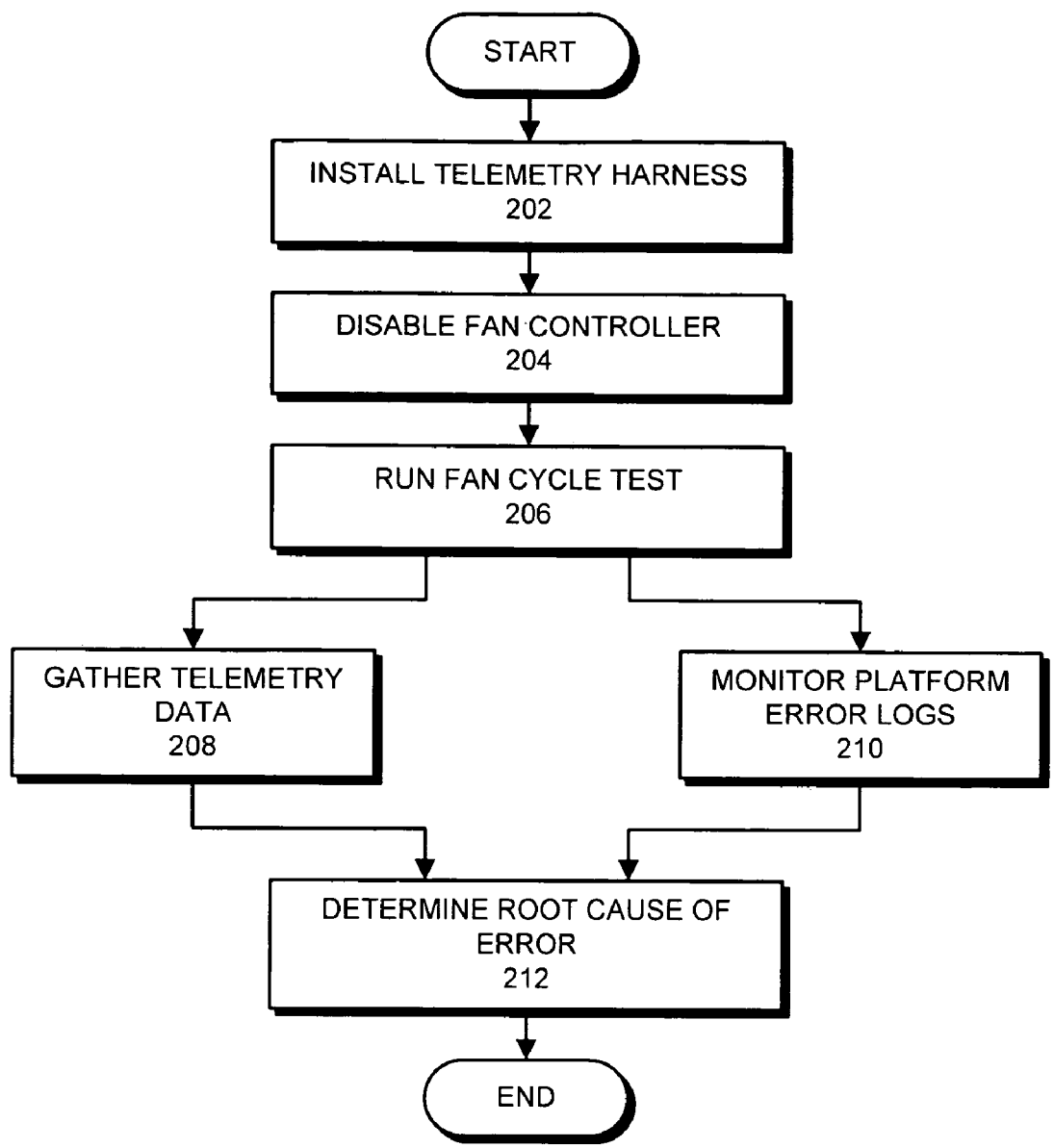
FIG. 2 presents a flow chart of a process for determining the effects of a temperature variation in a computer system in accordance with an embodiment of the present invention.

FIG. 2 presents a flow chart of a process for determining the effects of a temperature variation in a computer system in accordance with an embodiment of the present invention. The system starts by installing a telemetry harness in computer system 100 (step 202). In one embodiment of the present invention, this telemetry harness is part of performance monitor 120 within service processor 118. Next, the system disables a fan controller within computer system 100 (step 204). This fan controller normally attempts to keep the temperature within computer system 100 at a constant optimum level.

After the fan controller is disabled, the system runs a fan cycle test (step 206). In one embodiment of the present invention, this fan cycle test causes the temperature within the computer system to vary sinusoidally. For example, the fan cycle test can cause the temperature within computer system 100 to vary sinusoidally with an amplitude of 2–10 degrees C. and with a period of 5 minutes to one hour. Note that temperature gradients and cycles are more likely to trigger some types of problems than absolute temperatures.

Next, the system gathers telemetry data from performance monitor 120 (step 208) and also monitors platform error logs to detect failures (step 210). The system can use data from these sources to determine the cause of an error (step 212). As was mentioned above, temperature variations can cause a number of types of errors. For example, temperature variations can cause interconnect problems, delamination of bonded components, stress relaxation in metallized particle interconnect (MPI) elastomeric pin connectors, and intermittent sensor problems.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for determining the effects of temperature variations in a computer system, comprising:
   commencing operation of the computer system, wherein prior to commencing operation of the computer system, the method further comprises installing a telemetry harness within the computer system to gather performance parameters for the computer system;
   varying a flow of a coolant through the computer system to produce a temperature variation in the computer system while the computer system is operating; and
   monitoring the computer system to determine effects of the temperature variation on the computer system.

2. The method of claim 1, wherein monitoring the computer system involves monitoring for system errors that arise during operation of the computer system.

3. The method of claim 2, wherein the method further comprises attempting to determine a root cause of an error that arises during operation of the computer system.

4. The method of claim 1, wherein monitoring the computer system involves monitoring physical performance parameters within the computer system.

5. The method of claim 4, wherein monitoring the physical performance parameters involves monitoring temperature, voltage and/or current within the computer system.

6. The method of claim 5, wherein monitoring physical performance parameters involves attempting to detect a failing sensor within the computer system.

7. The method of claim 1, wherein monitoring the computer system involves monitoring internal performance parameters maintained by software within the computer system.

8. The method of claim 1, wherein varying the flow of the coolant involves varying the flow in a manner that produces a periodic variation in the temperature of the computer system.

9. The method of claim 8, wherein varying the flow of the coolant involves varying the flow in a manner that produces a substantially sinusoidal variation in the temperature of the computer system.

10. The method of claim 1,
    wherein the coolant is air; and
    wherein varying the flow of the coolant through the computer system involves varying the speed of a cooling fan that blows air through the computer system.

11. The method of claim 1,
    wherein the coolant is a liquid; and
    wherein varying the flow of the coolant through the computer system involves varying the speed of a coolant pump that pumps the coolant through the computer system.

12. An apparatus that determines the effects of temperature variations in a computer system, comprising:
    a variation mechanism configured to vary a flow of a coolant through the computer system to produce a temperature variation in the computer system while the computer system is operating; and
    a monitoring mechanism configured to monitor the computer system to determine effects of the temperature variation on the computer system, wherein the monitoring mechanism includes a telemetry harness, which is configured to gather performance parameters for the computer system.

13. The apparatus of claim 12, wherein the monitoring mechanism is configured to monitor for system errors that arise during operation of the computer system.

14. The apparatus of claim 13, wherein the monitoring mechanism is configured to determine a root cause of an error that arises during operation of the computer system.

15. The apparatus of claim 12, wherein the monitoring mechanism is configured to monitor physical performance parameters within the computer system.

16. The apparatus of claim 15, wherein while monitoring the physical performance parameters, the monitoring mechanism is configured to monitor temperature, voltage and/or current within the computer system.

17. The apparatus of claim 16, wherein while monitoring temperature, voltage and/or current, the monitoring mechanism is configured to detect a failing sensor within the computer system.

18. The apparatus of claim 12, wherein the monitoring mechanism is configured to monitor internal performance parameters maintained by software within the computer system.

19. The apparatus of claim 12, wherein the variation mechanism is configured to vary the flow of coolant in a manner that produces a periodic variation in the temperature of the computer system.

20. The apparatus of claim 19, wherein the variation mechanism is configured to vary the flow of coolant in a manner that produces a substantially sinusoidal variation in the temperature of the computer system.

21. The apparatus of claim 12,
wherein the coolant is air; and
wherein the variation mechanism is configured to vary the speed of a cooling fan that blows air through the computer system.

22. The apparatus of claim 12,
wherein the coolant is a liquid; and
wherein the variation mechanism is configured to vary the speed of a coolant pump that pumps the coolant through the computer system.

23. A computer system that is configured to determine the effects of temperature variations within the computer system, comprising:
a processor;
a memory;
a variation mechanism configured to vary a flow of a coolant through the computer system to produce a temperature variation in the computer system while the computer system is operating; and
a monitoring mechanism configured to monitor the computer system to determine effects of the temperature variation on the computer system, wherein the monitoring mechanism includes a telemetry harness, which is configured to gather performance parameters for the computer system.

24. The computer system of claim 23, wherein the monitoring mechanism is configured to monitor for system errors that arise during operation of the computer system.

25. The computer system of claim 24, wherein the monitoring mechanism is configured to determine a root cause of an error that arises during operation of the computer system.

26. The computer system of claim 23, wherein the monitoring mechanism is configured to monitor physical performance parameters within the computer system.

27. The computer system of claim 23, wherein the monitoring mechanism is configured to monitor internal performance parameters maintained by software within the computer system.

28. The computer system of claim 23, wherein the variation mechanism is configured to vary the flow of coolant in a manner that produces a periodic variation in the temperature of the computer system.

29. The computer system of claim 28, wherein varying the flow of the coolant involves varying the flow in a manner that produces a substantially sinusoidal variation in the temperature of the computer system.

30. The computer system of claim 23,
wherein the coolant is air; and
wherein the variation mechanism is configured to vary the speed of a cooling fan that blows air through the computer system.

31. The computer system of claim 23,
wherein the coolant is a liquid; and
wherein the variation mechanism is configured to vary the speed of a coolant pump that pumps the coolant through the computer system.

32. A computer-readable storage medium storing instructions that when executed by a computer cause the computer to perform a method for determining the effects of temperature variations in a computer system, wherein the computer-readable storage medium includes magnetic and optical storage devices, disk drives, magnetic tape, CDs (compact discs), and DVDs (digital versatile discs or digital video discs), the method comprising:
prior to commencing operation of the computer system, installing a telemetry harness within the computer system to gather performance parameters for the computer system;
varying a flow of a coolant through the computer system to produce a temperature variation in the computer system while the computer system is operating; and
monitoring the computer system to determine effects of the temperature variation on the computer system.

* * * * *